United States Patent
Du et al.

(10) Patent No.: US 12,337,413 B2
(45) Date of Patent: Jun. 24, 2025

(54) SYSTEM FOR SHAPING BEAM AND ADJUSTING BEAM ENERGY DENSITY, AND LASER HEAT TREATMENT PROCESS

(71) Applicant: HSG LASER CO., LTD., Guangdong (CN)

(72) Inventors: Bin Du, Guangdong (CN); Ruotao Li, Guangdong (CN); Yong Chang, Guangdong (CN)

(73) Assignee: HSG LASER CO., LTD., Foshan (CN)

( * ) Notice: Subject to any disclaimer, the term of this patent is extended or adjusted under 35 U.S.C. 154(b) by 0 days.

(21) Appl. No.: 18/806,758

(22) Filed: Aug. 16, 2024

(65) Prior Publication Data

US 2025/0162067 A1    May 22, 2025

(30) Foreign Application Priority Data

Nov. 20, 2023 (CN) .......................... 202311547399.0

(51) Int. Cl.
*B23K 26/06* (2014.01)
*G02B 27/09* (2006.01)

(52) U.S. Cl.
CPC ...... *B23K 26/0643* (2013.01); *G02B 27/0944* (2013.01)

(58) Field of Classification Search
None
See application file for complete search history.

(56) References Cited

U.S. PATENT DOCUMENTS

| | | | | |
|---|---|---|---|---|
| 6,008,914 A | * | 12/1999 | Sasagawa | B23K 26/389 |
| | | | | 359/566 |
| 6,922,420 B2 | * | 7/2005 | Yamazaki | C21D 1/09 |
| | | | | 372/29.014 |
| 2014/0290847 A1 | * | 10/2014 | Lee | G02B 27/0927 |
| | | | | 359/558 |

FOREIGN PATENT DOCUMENTS

| | | | |
|---|---|---|---|
| CN | 103869473 A | | 6/2014 |
| CN | 106735875 A | | 5/2017 |
| CN | 106755756 A | * | 5/2017 |
| CN | 207521870 U | | 6/2018 |
| CN | 112596251 A | * | 4/2021 |
| CN | 112620931 A | | 4/2021 |
| CN | 114571067 A | | 6/2022 |
| JP | 06081029 A | * | 3/1994 |

(Continued)

OTHER PUBLICATIONS

Machine translation of JP-2007063606-A, Oct. 2024 (Year: 2024).*

(Continued)

*Primary Examiner* — Geoffrey S Evans

(57) ABSTRACT

A system for shaping a beam and adjusting a beam energy density includes a laser source, a collimator mirror, a spatial light modulator, an X-direction mirror, a focusing assembly, and a Y-direction mirror. The spatial light modulator includes a binary grating and a mask which are disposed in sequence. A laser beam emitted by the laser source sequentially passes through the collimator mirror, the spatial light modulator, the X-direction mirror, the focusing assembly, and the Y-direction mirror, the laser beam is shaped by changing a diffraction period of the binary grating, an energy density distribution of the laser beam is changed by adjusting a grating density of the mask, and the X-direction mirror and the Y-direction mirror are used for a dynamic scanning movement of the laser beam.

18 Claims, 5 Drawing Sheets

(56) References Cited

FOREIGN PATENT DOCUMENTS

| | | | | |
|---|---|---|---|---|
| JP | 2004288803 | A | * | 10/2004 |
| JP | 2007063606 | A | * | 3/2007 |
| KR | 20220088051 | A | | 6/2022 |

OTHER PUBLICATIONS

Machine translation of JPH0681029-A, Oct. 2024 (Year: 2024).*
Machine translation of CN-106755756-A, Oct. 2024 (Year: 2024).*
Machine translation of CN-112596251-A, Oct. 2024 (Year: 2024).*
Machine translation of Japan Patent No. 2004288803-A, Oct. 2024 (Year: 2024).*
"Hardening Efficiency and Microstructural Changes during laser surface hardening of 50CrMo4 Steel", Maharjan et al., Journal Metals, vol. 11, Issue 12, published Dec. 13, 2021 (Year: 2021).*
1st Office Action of counterpart Chinese Patent Application No. 202311547399.0 issued on Apr. 7, 2024.
Notice of Allowance of counterpart Chinese Patent Application No. 202311547399.0 issued on May 8, 2024.

* cited by examiner

SYSTEM FOR SHAPING BEAM AND ADJUSTING BEAM ENERGY DENSITY, AND LASER HEAT TREATMENT PROCESS

CROSS REFERENCE TO RELATED APPLICATIONS

The present application claims the benefit of Chinese Patent Application No. 202311547399.0 filed on Nov. 20, 2023, the contents of which are incorporated herein by reference in their entirety.

TECHNICAL FIELD

The present invention relates to the technical field of laser heat treatment of a material, and in particular, to a system for shaping a beam and adjusting a beam energy density, and a laser heat treatment process.

BACKGROUND

Laser can be used for heat treatment, and the surface of metal is treated by a laser beam with a high power density to achieve phase change hardening of the metal, such as surface quenching, surface amorphization, surface remelting quenching, and surface alloying. As compared to a conventional heat treatment process, different surface components and organizational structures can be generated on the surface of the material by the laser heat treatment. A plurality of laser light sources are generally used in the laser heat treatment, laser beams generated by the plurality of laser light sources are focused on an area, the area to be treated is subjected to heat treatment, and a position and a parameter of each laser light source can be adjusted to achieve uniform laser irradiation, but for the energy difference and attenuation difference in laser generators, it is complex to control and calibrate an optical field. In addition, the dynamic beam process is controlled by multi-plane phase adjustment (which splits a laser beam into multiple small beams and then combines the small beams on the surface of the target) to realize uniform heating of the area to be processed. However, this requires a high-precision beam splitting and combining technology and requires complex optical components to form an optical system, with high loss of the laser beam during transmission, and low efficiency of the optical system. Moreover, wavelengths of the laser beam are sensitive and different optical components are required under laser beams of different wavelengths, making it equally complex to use. Now, a laser system that can control a shape of the laser beam and an energy density of the spot is required, thereby realizing uniform heat treatment of the surface of the workpiece and easy control.

Patent application with publication No. CN114571067A discloses a method for laser polishing of additive curved surfaces based on beam shaping and spot adjustment, in which a point light source is divided into processing light and indicator light by a beam splitter, the processing light is shaped into a linear light source through a cylindrical lens, and the indicator light is positioned in a traveling direction in front of the processing linear light source, curved surface morphology information is provided to guide the linear light source processing light to change the spot area between passes and in each pass by deflecting the light beam so as to adjust the energy density and realize rough polishing and fine polishing. Only the surface of the workpiece is treated by this laser polishing method, the material at a certain depth from the surface of the workpiece cannot be subjected to heat treatment with high consistency, and the treated workpiece surface is not homogenized to a high degree.

SUMMARY

One of the objectives of the present invention is to provide a system for shaping a beam and adjusting a beam energy density, which solves the problems of low uniformity of a laser beam for treating a workpiece in an existing laser heat treating system and low consistency of heat treatment of the workpiece in different depths.

To achieve the above objectives of the present invention, technical solutions adopted in the present invention are as follows:

a system for shaping a beam and adjusting a beam energy density includes a laser source, a collimator mirror, a spatial light modulator, an X-direction mirror, a focusing assembly, and a Y-direction mirror. The spatial light modulator includes a binary grating and a mask which are disposed in sequence, a laser beam emitted by the laser source sequentially passes through the collimator mirror, the spatial light modulator, the X-direction mirror, the focusing assembly and the Y-direction mirror, the laser beam is shaped by changing a diffraction period of the binary grating, an energy density distribution of the laser beam is changed by adjusting the mask, and the X-direction mirror and Y-direction mirror are used for a dynamic scanning movement of the laser beam, so the surface of the workpiece can be heated uniformly at a certain depth and then is cooled to obtain a hardened layer structure with a consistent structure.

Further, a thermal efficiency of the laser and an energy density model of the energy density distribution of the spot during processing are as follows:

$$\frac{\partial T}{\partial t} = \frac{2\pi\lambda v}{Bq}(T - T_0); ①$$

$$E_{utilized} = \int_{T_0}^{T_f} \rho V C_p dT + \rho V L_p = \rho A v C_p (A_3 - T_0) + \rho A v L_p; ②$$

$$H = \frac{\Delta H * A}{E_{in}}; ③$$

according to the Rosenthal equation, in Equation ①, $\lambda$ is a thermal conductivity of a material to be processed, v is a feed speed of the material, B is an absorption rate, q is a laser source power, $T_0$ is an ambient temperature, and T is an actual temperature;

in Equation ②, $E_{utilized}$ is a lowest energy rate, $\rho$ is a density of a material to be processed, $C_p$ is a specific heat capacity of the material, V is a volume of the material in a processed hardened zone, $L_p$ is heat energy required for a phase change transformation of the material, $T_0$ is an ambient temperature, $T_f$ is a highest temperature of the surface of the material, $A_3$ is an upper limit temperature for material hardening, v is a scanning speed of the laser beam, and A is a cross-sectional area of the material;

in Equation ③, H is a hardening efficiency index, $\Delta H$ is an average adding value of material hardness, A is a cross-sectional area of a material quenching surface, $E_{in}$ corresponds to an overall energy density provided, and the quality of a hardened layer on the surface of the material after heat treatment can be evaluated.

Further, calculation equations of a diffraction angle of the laser beam are as follows:

$$T(\sin \alpha + \sin \beta) = m\lambda;$$

$$\beta = \sin \beta = \lambda/T - \sin \alpha;$$

$$\sin \alpha = 0 (\alpha < 10°);$$

$$\beta = \beta/T;$$

T corresponds to a diffraction period of the binary grating, B is a diffraction angle of the binary grating, a is an incidence angle of the binary grating, m is a diffraction order of the binary grating, and A is a wavelength of the incident light. The incident laser beam is shaped by the binary grating in order to homogenize the spot energy density.

Preferably, the focusing assembly includes at least one cylindrical lens, and the cylindrical lens is a convex lens that can perform convergence on the laser beam.

More preferably, laser beam oscillating waveforms generated by the laser source include a sine wave, a rectangular wave, a triangular wave, a series circular wave, and a series elliptical wave. Laser beams with different oscillating waveforms are selected based on different materials to achieve an optimal thermal efficiency.

A second objective of the present invention is to provide a laser heat treatment process, which solves the problem that the existing laser heat treatment process is complicated to use and low in thermal efficiency.

To achieve the above objectives of the present invention, technical solutions adopted in the present invention are as follows:

a laser heat treatment process, implemented by the system for shaping a beam and adjusting a beam energy density, includes the following steps:

S1. parameter acquisition: looking up a table to obtain data about a phase change temperature of a workpiece to be processed as well as a heat treatment depth of the workpiece;

S2. beam shaping: generating a laser beam by the laser source, enabling the laser beam to pass through the collimator mirror and then irradiate onto the spatial light modulator, enabling the collimated laser beam to be incident on the binary grating, and changing a period of the binary grating to change a diffraction angle of the laser beam so as to shape the laser beam;

S3. beam energy density adjustment: allowing the laser beam diffracted from the binary grating to enter the mask, and adjusting a gating density of the mask to homogenize an energy density of the laser beam; and S4. scanning treatment: using the laser beam subjected to shaping and energy homogenization to perform heat treatment on the surface of the workpiece in a scanning movement manner.

Further, in Step S4, a position and a speed of the laser beam irradiating the surface of the workpiece are controlled by the X-direction mirror and the Y-direction mirror to realize dynamic adjustment.

Preferably, in Step S4, a movement of the laser beam is changeable unidirectionally by changing a position of the focusing assembly.

Preferably, in Step S2, spot shapes of the laser beam shaped by the binary grating include a rectangular shape and a circular shape.

More preferably, in Step S3, a change in energy density of the laser beam is time series related.

Beneficial effects of the present invention are as follows:

(1) the system for shaping a beam and adjusting a beam energy density is provided with a spatial light modulator including a binary grating and a mask, and the binary grating diffracts the passing laser beam. The spot is shaped by adjusting a diffraction period of the binary grating to remove higher-order beams, change a diffraction angle and a diffraction efficiency of the laser beam, and eliminate overlapping portions of diffracted beams with successive orders, thus improving the quality of the laser beam and reducing damage to the material to be processed. The energy density distribution of the laser beam is then controlled by a grating density of the mask, in order to make a spot energy of the laser beam irradiating onto the workpiece uniform, and the quality of the surface of the workpiece subjected to heat treatment uniform. A movement path of the laser beam is controlled by the X-direction mirror and the Y-direction mirror to enable the laser beam to scan the surface of the workpiece, and the laser beam has a variety of scanning cross-sections and can also be switched between different vibration waveforms, so that the heat treatment homogenization and the heat treatment efficiency of the surface of the workpiece can be achieved by combining different scanning cross-sections with vibration waveforms.

(2) In this laser heat treatment process, the optimal temperature and threshold for heating the material are determined by obtaining parameters of a treatment depth of the workpiece and a phase change heat melting state of the material, then a laser beam is output by the laser system for shaping the beam and adjusting the beam energy density, the laser beam is shaped in the process of heating the workpiece with the laser beam to output spots with different cross-sections and adjust the energy of the spot in real time. The laser beam performs heat treatment on the surface of the workpiece in a scanning manner, the heat treatment efficiency is optimized by combining spot cross-sections and controlling an energy density distribution of the laser beam, and a hardened surface with uniform quality and complete phase change is obtained, thereby ensuring consistent metallographic properties of the surface of the workpiece at the same depth.

(3) In this laser heat treatment process, laser beam oscillating waveforms after shaping include a sine wave, a rectangular wave, a triangular wave, a series circular wave, and a series elliptical wave, a spot of the laser beam passing through the mask includes a rectangular shape and a circular shape, and laser beams with different oscillating waveforms and spot shapes have different processing capabilities. By adjusting cross-sections of the spot and laser beam oscillating waveforms and according to data about a phase change of the material itself as well as a heat treatment depth required, processing paths can be optimized for different types of materials and different processing depths to improve the heat treatment performance.

REFERENCE NUMERALS

Figure 1:
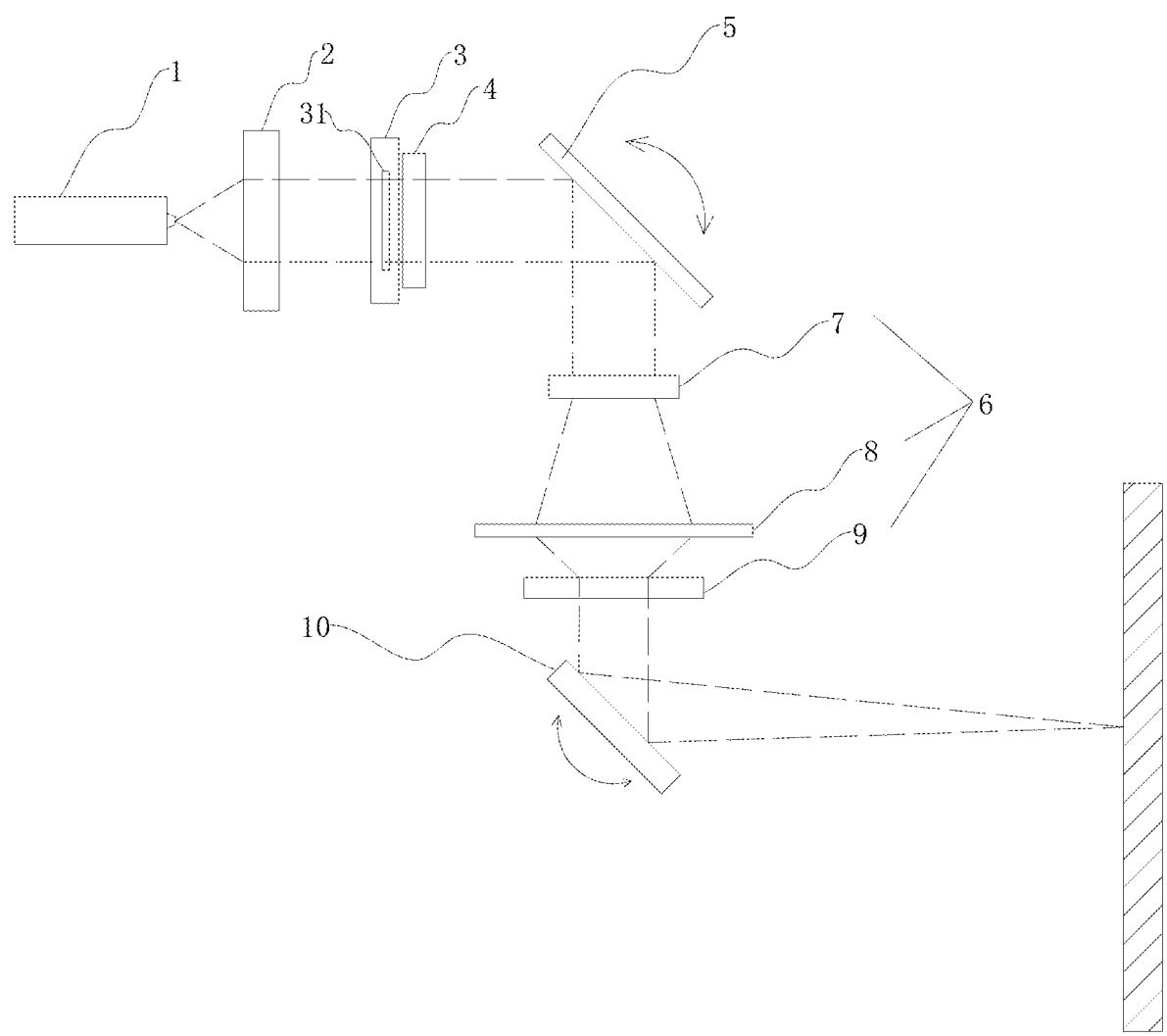
FIG. 1 is a composition diagram of a system for shaping a beam and adjusting a beam energy density according to the present invention.

1. laser source; 2. collimator mirror; 3. spatial light modulator; 31. binary grating; 4. mask; 5. X-direction mirror; 6. focusing assembly; 7. first cylindrical lens; 8. second cylindrical lens; 9. third cylindrical lens; 10. Y-direction mirror.

DESCRIPTION OF THE EMBODIMENTS

The technical solutions in embodiments of the present invention will be clearly and completely described below with reference to the accompanying drawings in the embodiments of the present invention. Apparently, the described embodiments are only a part rather than all of the embodiments of the present invention. All other embodiments obtained by a person of ordinary skill in the art based on the embodiments of the present invention without creative efforts shall fall within the protection scope of the present invention.

Embodiment 1

As shown in FIGS. 1 to 6, this embodiment discloses a system for shaping a beam and adjusting a beam energy density, including a laser source 1, a collimator mirror 2, a spatial light modulator 3, an X-direction mirror 5, a focusing component 6 and a Y-direction mirror 10. The spatial light modulator 3 includes a binary grating 31 and a mask 4 which are disposed in sequence, a laser beam is generated by the laser source 1, and the laser beam emitted by the laser source 1 sequentially passes through the collimator mirror 2, the spatial light modulator 3, the X-direction mirror 5, the focusing assembly 6 and the Y-direction mirror 10, and then irradiates the surface of the workpiece to be processed. The laser beam passing through the collimator mirror 2 is dispersed by changing its direction and light rays are parallel to each other, preventing the light rays from overlapping each other. The laser beam is shaped by changing a diffraction period of the binary grating 31, an energy density distribution of the laser beam is then changed by adjusting the mask 4, and the X-direction mirror 5 and Y-direction mirror 10 are used for a dynamic scanning movement of the laser beam, to control movements in two axial directions, respectively.

Laser beam oscillating waveforms generated by the laser source 1 include a sine wave, a rectangular wave, a triangular wave, a series circular wave, and a series elliptical wave, and the laser mode can be switched during the heat treatment.

Further, an energy density of the laser beam is adjusted by the spatial light modulator 3 to realize heat treatment on the complex surface, thereby ensuring that the energy density of the laser beam irradiating onto the workpiece is uniform. A spot after homogenizing treatment is affected by differences in height of complex workpiece surfaces and differences in energy fluctuations before and after a focal point. Therefore, to ensure that the surface of the workpiece receives consistent heat, the laser beam is moved in a scanning manner, the energy density distribution of the laser beam is adjusted by the spatial light modulator 3, and multilevel crests in the laser beam are optimized, to make energy generated by heat treatment at the same depth of the workpiece consistent.

In addition, by changing an oscillation mode of the laser beam, data about a hardness and an abrasion resistance of a metal surface after the surface of the material has been hardened by different lasers can be collected to find the optimal laser beam oscillation mode and heat distribution pattern, thereby improving the quality and the service life of the hardened layer on the surface of the material, reducing material deformation and residual internal stress, improving the heat conducting efficiency inside the material and the cooling efficiency of multi-phase flow heat conduction, and saving energy consumption.

$$\frac{\partial T}{\partial t} = \frac{2\pi\lambda\vartheta}{Bq}(T-T_0); ①$$

$$E_{utilized} = \int_{T_0}^{T_f} \rho V C_p dT + \rho V L_p = \rho A v C_p (A_3 - T_0) + \rho A v L_p; ②$$

$$H = \frac{\Delta H * A}{E_{in}}; ③$$

According to the Rosenthal equation (which is for analyzing a temperature distribution of a moving point heat source on a plate), in Equation ①, λ is a thermal conductivity of a material to be processed, v is a feed speed of the material, B is an absorption rate, q is a laser source power, and $T_0$ is an ambient temperature; whether the hardening treatment of the material is complete is confirmed based on a conversion time from a phase change temperature to a cooling temperature on the surface of the material, and if a cooling rate on the surface of the material and a cooling rate of the material at a certain depth are both higher than a critical cooling rate of the material, it is known that the laser heat treatment is complete.

In Equation ②, $E_{utilized}$ is a lowest energy rate, p is a density of a material to be processed, $C_p$ is a specific heat capacity of the material, V is a volume of the material in a processed hardened zone, $L_p$ is heat energy required for a phase change transformation of the material, $T_0$ is an ambient temperature, $T_f$ is a highest temperature of the surface of the material, for materials with an austenitic structure, $A_3$ is an upper limit temperature for material hardening, v is a scanning speed of the laser beam, and A is a cross-sectional area of the material; the energy for performing heat treatment on the surface of the material includes two parts, one is the energy required to raise the temperature to reach a phase transition state of the material, and the other is the energy required for a phase change, for example, temperature energy required for a phase change in iron quenching and energy to obtain the martensitic metallurgical organization, i.e., $E_{utilized}$ is calculated in Equation 2.

In Equation 3, H is a hardening efficiency index, ΔH is an average adding value of material hardness, A is a cross-sectional area of a material quenching surface, $E_{in}$ corresponds to an overall energy density provided, and $E_{utilized}$ is an actually utilized energy density.

Further, a spot profile of the laser beam is first modulated by the binary grating 31 and the mask 4 in the spatial light modulator 3 to reduce a diffraction effect around the shaped laser beam, and a rectangular spot profile with an arbitrary shape can be trimmed, so that ±1st order beam is blocked by a slit by adjusting a diffraction period of the binary grating 31, and higher-order beams are completely removed. The diffraction angle and the diffraction efficiency of the laser beam are affected by the binary grating 31, and successive orders of diffracted beams will partially overlap, which leads to a less uniform energy density distribution of the laser beam and the reduced quality of the surface of the workpiece subjected to heat treatment.

The equation for local energy ratios under different grating densities of the mask 4 is as follows:

$$\zeta = \frac{\int I_{shaped} ds_{mask}}{\iint I_0 ds}$$

ζ corresponds to a local energy ratio, $I_{shaped}$ is an energy intensity after shaping, $s_{mask}$ is a mask area, and $\iint I_0 ds$ corresponds to an original spot curved surface integral, where a reference grating period is changed from 120 lm to 500 lm, and a local energy ratio is changed from 65% to 72%.

The diffraction angle of the laser beam can be calculated according to the following equations:

$T(\sin \alpha + \sin \beta) = m\lambda$;

$\beta = \sin \beta = \lambda/T - \sin \alpha$;

$\sin \alpha = 0 (\alpha < 10°)$;

$\beta = \beta/T$;

in the equations, T corresponds to a diffraction period of the binary grating, β is a diffraction angle of the binary grating, α is an incidence angle of the binary grating, m is a diffraction order of the binary grating, and λ is a wavelength of the incident light. From the above equations, it is known that as the diffraction period of the binary grating decreases, the diffraction efficiency of the binary grating will decrease, which will lead to processing damage in a non-masked region where order 0 energy is higher than a damage threshold of the material.

Figure 2:
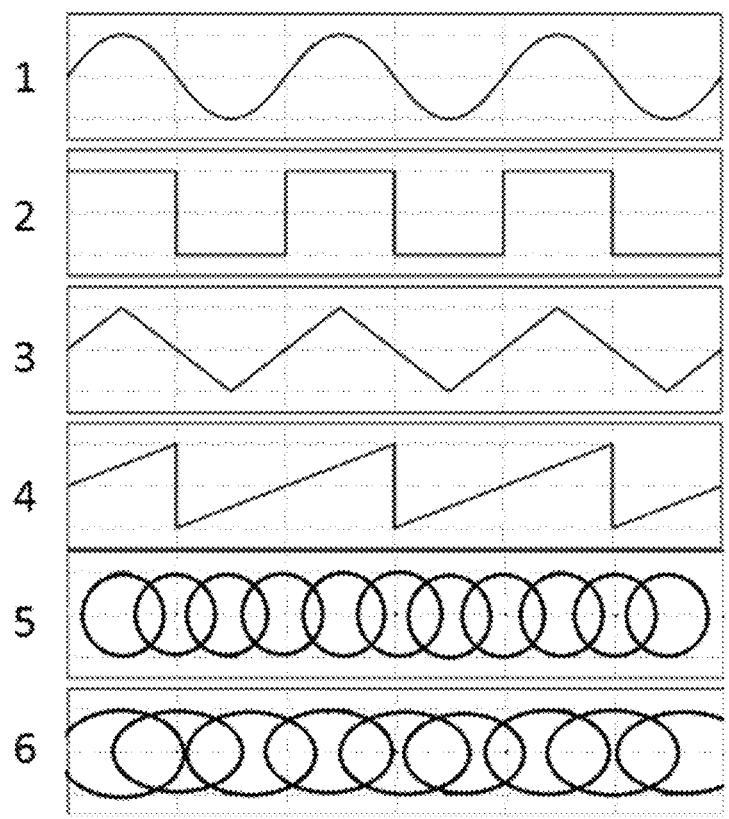
FIG. 2 is a schematic diagram of waveforms of a laser beam in a system for shaping a beam and adjusting a beam energy density according to the present invention.
Figure 3:
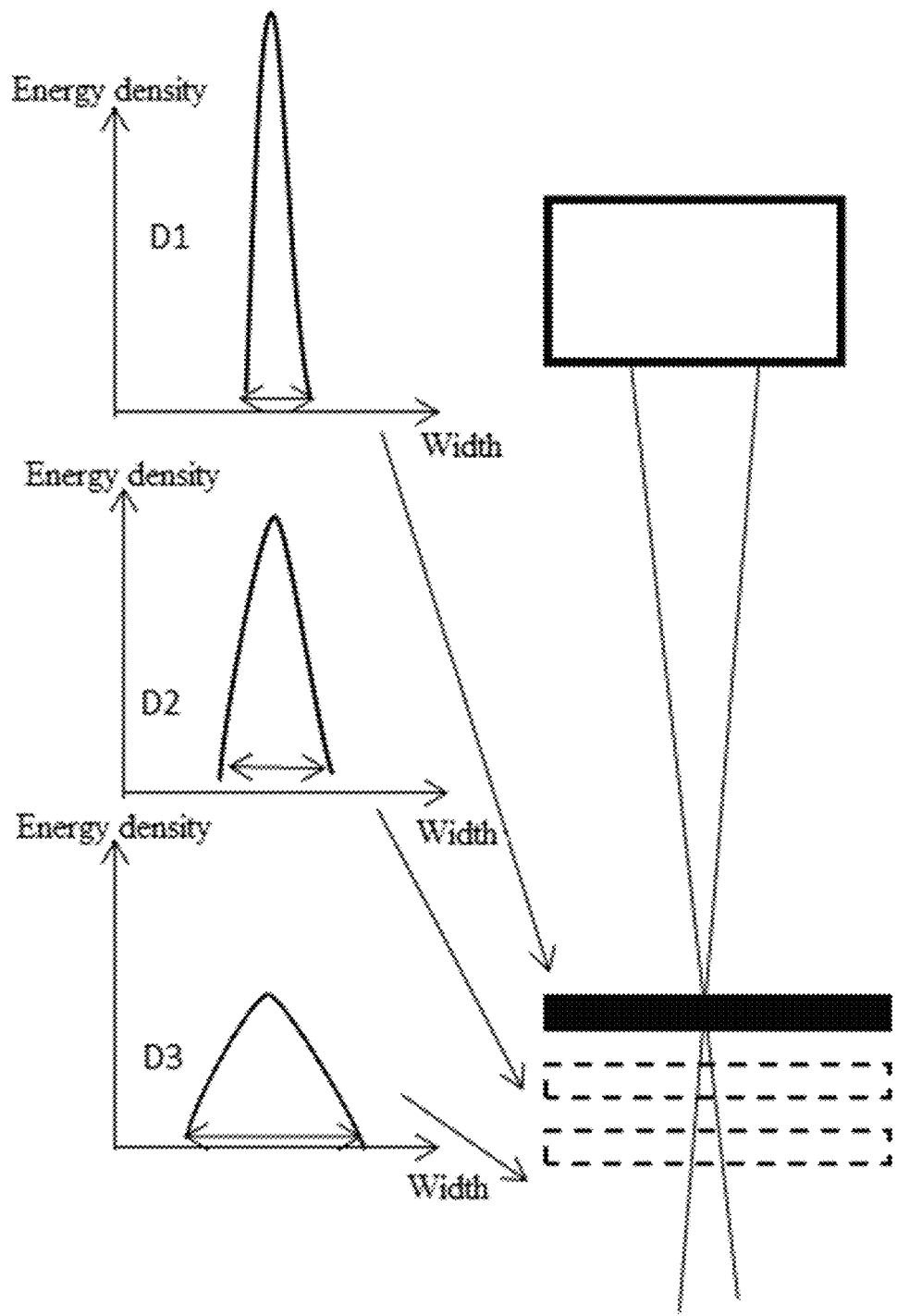
FIG. 3 is an energy distribution diagram for complex surface heat treatment by a system for shaping a beam and adjusting a beam energy density according to the present invention.
Figure 4:
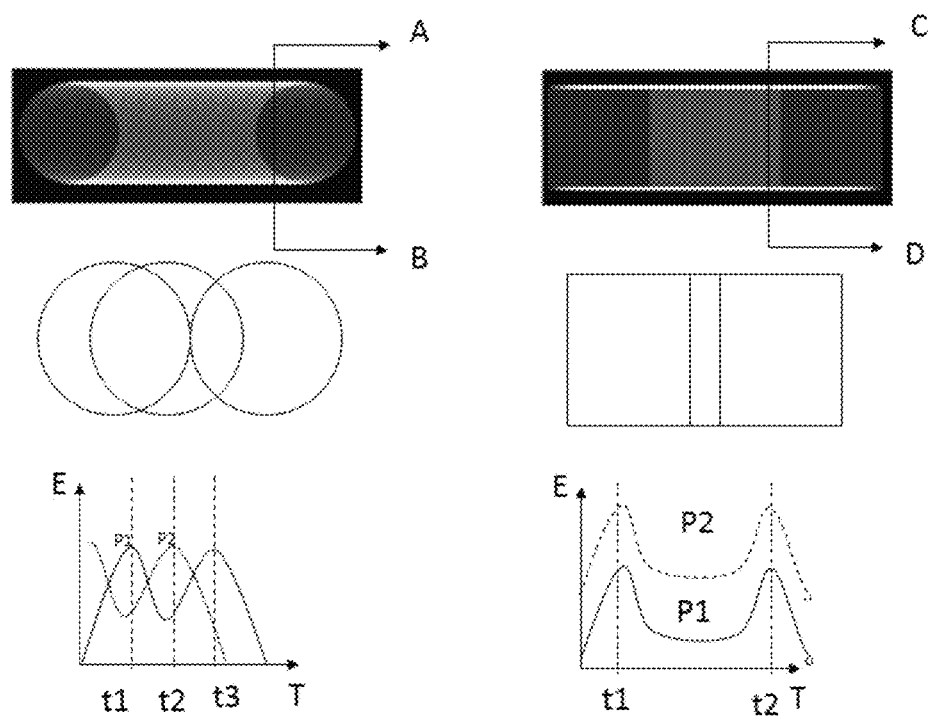
FIG. 4 is an energy density diagram of laser beams with different oscillation periods in a system for shaping a beam and adjusting a beam energy density according to the present invention.
Figure 5:
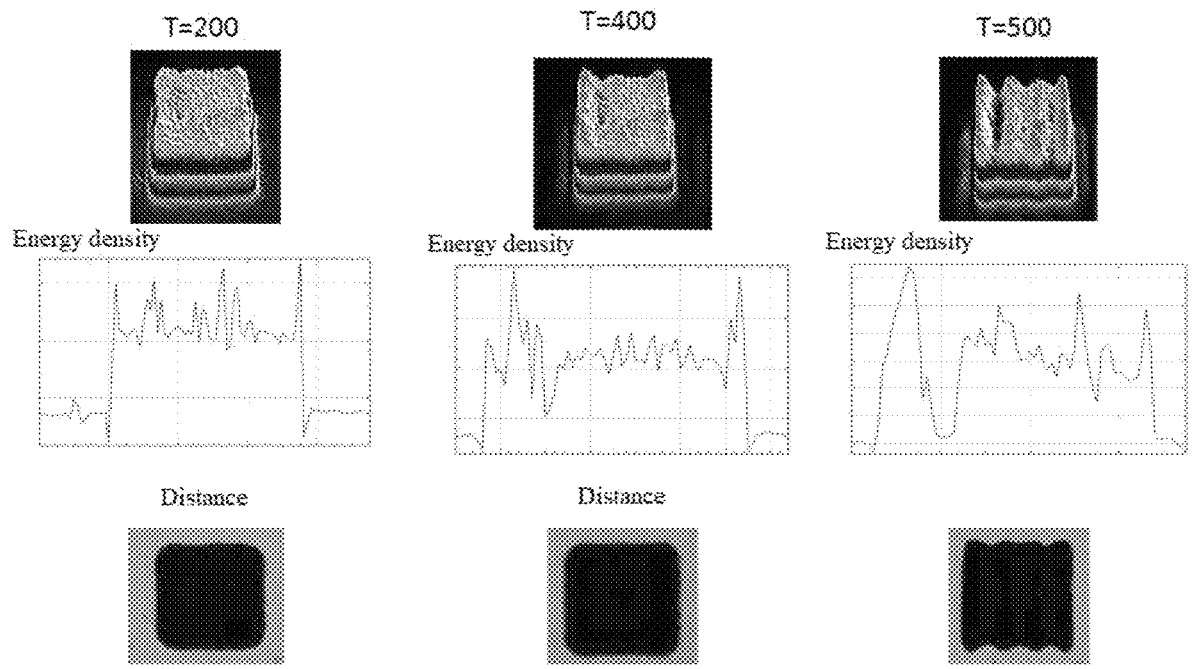
FIG. 5 is an energy density diagram of a binary grating with different periods in a system for shaping a beam and adjusting a beam energy density according to the present invention.
Figure 6:
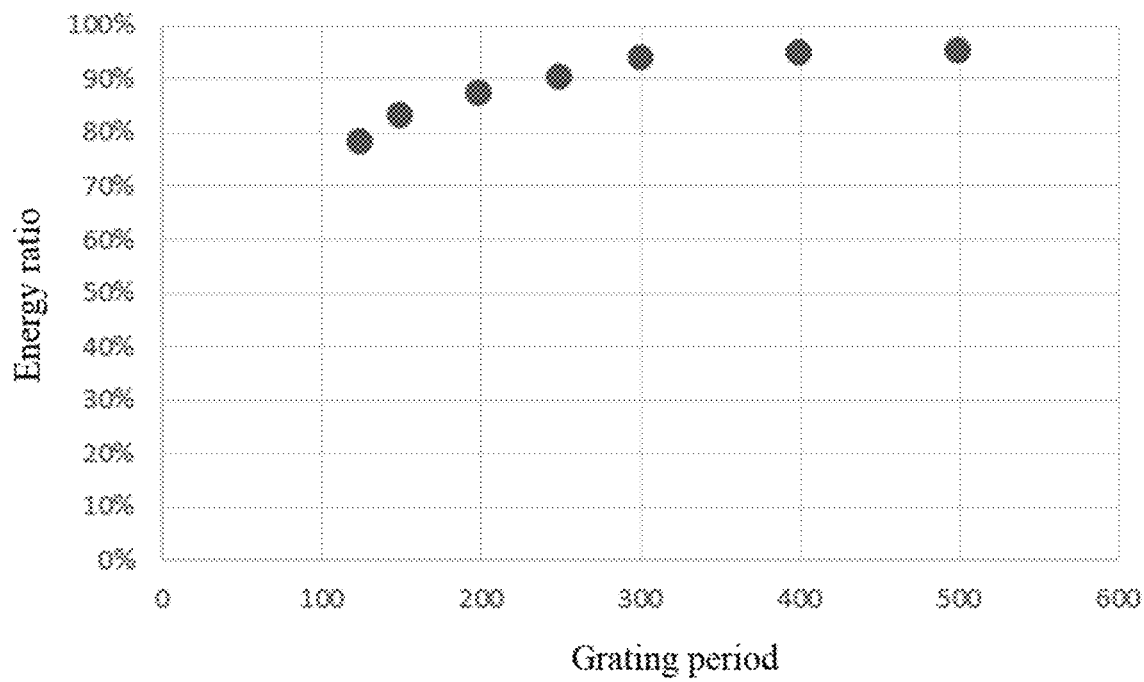
FIG. 6 is an energy ratio scatter diagram corresponding to different grating periods in a system for shaping a beam and adjusting a beam energy density according to the present invention.

Referring to FIG. 3, it can be seen that there are significant differences in amount of energy distribution and height of peak energy of a static spot of the laser beam in planes before and after a focal point, so for complex curved surfaces to be processed, by optimizing the energy density distribution of the laser beam, homogenized curved surfaces are irradiated with the laser beam energy. Referring to FIG. 2, the laser beam can be switched between various oscillating wavelengths during heat treatment. Referring to FIG. 4, energy density distributions of different scanning trajectories of the laser beam during scanning with rectangular and circular cross-section spots can be seen, and according to a timeseries relationship, the overall adjustment of the laser energy density distribution can be better realized, so that the energy density of the laser beam is always kept within a certain range, and a difference in warming on the surface of the workpiece is reduced. Referring to FIG. 5, dynamic performance of the laser beam is optimized by adjusting the overall spot energy density according to a period of the binary grating 31 and an energy density distribution of the laser beam passing through the mask 4, and the laser energy density distribution is adjusted by controlling the diffraction efficiency according to the diffraction period, so that efficiency differences in utilizing energy can be evaluated when different areas of the workpiece are processed.

Preferably, the focusing assembly 6 includes at least one cylindrical lens, the cylindrical lens is a convex lens, and the shaped and homogenized laser beams are converged by the focusing assembly 6 to irradiate the surface of the workpiece.

More preferably, the focusing assembly 6 includes a first cylindrical lens 7, a second cylindrical lens 8, and a third cylindrical lens 9 arranged in parallel in sequence. Adjusting the spacing between the first cylindrical lens 7, the second cylindrical lens 8, and the third cylindrical lens 9 can cause the laser beam to move in a single direction . . .

TABLE 1-1

Effects of Heat Treatment of Material Under Different Laser Beam Oscillation Waveforms and Spots

| Spot Shape | Oscillation Mode | Action Depth mm | Phase Change Characterization Crystal Percentage % | Specified Element Impurity-removing Percentage % |
|---|---|---|---|---|
| Circular shape | No oscillation | 0.15-2.3 | 13.2 | 16 |
| | Sine | | 5.7 | 9 |
| | Square | | 6.3 | 11.5 |
| | Triangular | | 7.1 | 13 |
| | Zigzag | | 7.2 | 11 |
| | Circular shape | | 5.6 | 10 |
| | Elliptical | | 4.8 | 9 |
| Square shape | No oscillation | 0.15-2.3 | 10.8 | 19 |
| | Sine | | 4.3 | 10 |
| | Square | | 5.7 | 12 |
| | Triangular | | 6.9 | 14.5 |
| | Zigzag | | 6.8 | 13.5 |
| | Circular shape | | 5.4 | 11 |
| | Elliptical | | 3.2 | 10 |

Referring to Table 1-1, by comparing the effects of performing heat treatment on materials under different oscillation modes and spot shapes, the stability of the optimized laser beam for a phase change heat melting state of the material is improved, and the performance of the hardened film layer formed after the material is cooled is improved. By comparing impurity-removing ratios of phase change crystals and material specified elements, a process path for heat treatment can be optimized, an energy density distribution of the laser beam can be changed for different surface shapes and material properties, and the efficiency of heat-treating the workpiece and the performance of generating a hardened layer on the surface of the material can be improved.

Embodiment 2

Figure 7:
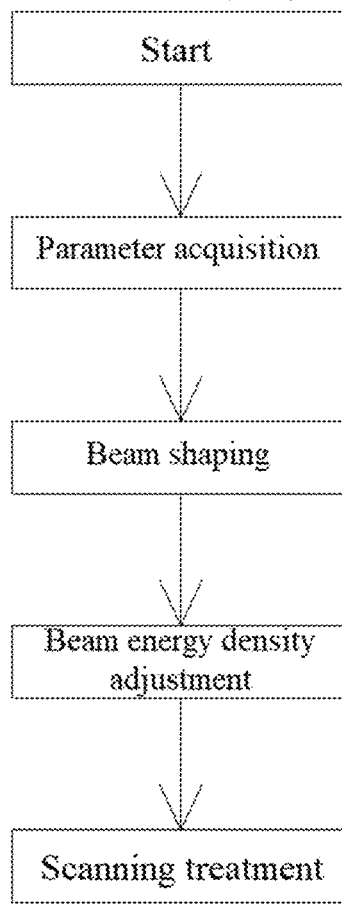
FIG. 7 is a flow chart of a laser heat treatment process according to the present invention.

As shown in FIG. 7, this embodiment further discloses a laser heat treatment process, including the following steps:

S1. parameter acquisition: looking up a table to obtain a heated and cooled phase change temperature of a workpiece to be processed as well as a heat treatment depth of the workpiece;

S2. beam shaping: generating a laser beam by the laser source 1, enabling the laser beam to pass through the collimator mirror 2 and then irradiate onto the spatial light modulator, enabling the collimated laser beam to be incident on the binary grating 31, and changing a period of the binary grating 31 to change a diffraction angle of the laser beam so as to shape the laser beam;

S3. beam energy density adjustment: allowing the laser beam diffracted from the binary grating 31 to enter the mask 4, and adjusting a gating density of the mask 4 to homogenize an energy density of the laser beam; and S4. scanning treatment: performing heat treatment on the surface of the workpiece by the shaped and energy-homogenized laser beam in a scanning movement manner, and optimizing the heat treatment depth and the depth of the action interval, so that the residual stress on the surface of the material is homogenized, and the hardness, the adhesion and the strength of the hardened layer in the heat treatment center and the edge region of the material are enhanced.

Referring to FIG. 4, the spot with corresponding characteristics being related to the feed and scanning speeds of the laser head can be viewed in a superimposed field by energy density distributions of different laser beams corresponding to different timeseries, and an energy density distribution of the corresponding frequency doubled laser beam can be determined according to a peak rating and an energy density distribution of scanning overlapping.

In Step S4, a position and a speed of the laser beam irradiating the surface of the workpiece are controlled by the X-direction mirror 5 and the Y-direction mirror 10 to realize dynamic adjustment, with the X-direction mirror 5 and the Y-direction mirror 10 controlling one axial movement, respectively, so that when the laser beam travels in a straight line, only one axial movement is required to be changed at the same time.

Preferably, in Step S4, a movement of the laser beam is changeable unidirectionally by changing a position of the focusing assembly 6, and the movement unidirectionally is more stable.

Preferably, in Step S2, spot shapes of the laser beam shaped by the binary grating 31 include a rectangular shape and a circular shape, and heat interaction in regular shapes is easy to control.

Specifically referring to FIG. 5, preferably, in Step S3, a change in the energy density of the laser beam is timeseries-related, and when the irradiation time of the laser beam is within a certain range, the energy density of the laser beam is distributed within a certain range.

According to the disclosure and teachings of the above description, the person skilled in the art to which the present invention belongs may also make changes and modifications to the above implementations. Therefore, the present invention is not limited to the detailed description disclosed and described above, and some modifications and changes should also fall within the protection scope of the claims of the present invention. In addition, although some specific terms are used in the specification, these terms are only for the convenience of description and do not constitute any limitation to the present invention.

What is claimed is:

1. A system for shaping a beam and adjusting a beam energy density, comprising a laser source (1), a collimator mirror (2), a spatial light modulator (3), an X-direction mirror (5), a focusing assembly (6) and a Y-direction mirror (10), characterized in that: the spatial light modulator (3) comprises a binary grating (31) and a mask (4) which are disposed in sequence, a laser beam emitted by the laser source (1) sequentially passes through the collimator mirror (2), the spatial light modulator (3), the X-direction mirror (5), the focusing assembly (6) and the Y-direction mirror (10), the binary grating (31) is configured to change a diffraction period to shape the laser beam, the mask (4) is configured to adjust a grating density to change an energy density distribution of the laser beam, and the X-direction mirror (5) and the Y-direction mirror (10) are used for a dynamic scanning movement of the laser beam;

a thermal efficiency of the laser and an energy density model of the energy density distribution of the spot during processing are as follows:

$$\frac{\partial T}{\partial t} = \frac{2\pi\lambda v}{Bq}(T - T_0); ①$$

$$E_{utilized} = \int_{T_0}^{T_f} \rho V C_p dT + \rho V L_p = \rho A v C_p (A_3 - T_0) + \rho A v L_p; ②$$

$$H = \frac{\Delta H * A}{E_{in}}; ③$$

according to the Rosenthal equation, in Equation ①, $\lambda$ is a thermal conductivity of a material to be processed, v is a feed speed of the material, B is an absorption rate, q is a laser source power, $T_0$ is an ambient temperature, and T is an actual temperature;

in Equation ②, $E_{utilized}$ is a lowest energy rate, $\rho$ is a density of a material to be processed, $C_p$ is a specific heat capacity of the material, V is a volume of the material in a processed hardened zone, $L_p$ is heat energy required for a phase change transformation of the material, $T_0$ is an ambient temperature, $T_f$ is a highest temperature of the surface of the material, $A_3$ is an upper limit temperature for material hardening, v is a scanning speed of the laser beam, and A is a cross-sectional area of the material;

in Equation ③, H is a hardening efficiency index, $\Delta H$ is an average adding value of material hardness, A is a cross-sectional area of a material quenching surface, and $E_{in}$ corresponds to an overall energy density provided.

2. The system for shaping a beam and adjusting a beam energy density according to claim 1, characterized in that: calculation equations of a diffraction angle of the laser beam are as follows:

$T(\sin \alpha + \sin \beta) = m\lambda;$ $\beta = \sin \beta = \lambda/T - \sin \alpha;$ $\sin \alpha = 0 (\alpha < 10°);$ $\beta = \beta/T;$ T corresponds to a diffraction period of the binary grating, $\beta$ is a diffraction angle of the binary grating, $\alpha$ is an incidence angle of the binary grating, m is a diffraction order of the binary grating, and $\lambda$ is a wavelength of the incident light.

3. The system for shaping a beam and adjusting a beam energy density according to claim 1, characterized in that:

the focusing assembly (6) comprises at least one cylindrical lens, the cylindrical lens being a convex lens.

4. The system for shaping a beam and adjusting a beam energy density according to claim 1, characterized in that:
laser beam oscillating waveforms generated by the laser source (1) comprise a sine wave, a rectangular wave, a triangular wave, a series circular wave, and a series elliptical wave.

5. A laser heat treatment process, being implemented by the system for shaping a beam and adjusting a beam energy density according to claim 1, and comprising the following steps:
Step S1. parameter acquisition: looking up a table to obtain data about a phase change temperature of a workpiece to be processed as well as a heat treatment depth of the workpiece;
Step S2. beam shaping: generating a laser beam by the laser source (1), enabling the laser beam to pass through the collimator mirror (2) and then irradiate onto the spatial light modulator (3), enabling the collimated laser beam to be incident on the binary grating (31), and changing a period of the binary grating (31) to change a diffraction angle of the laser beam so as to shape the laser beam;
Step S3. beam energy density adjustment: allowing the laser beam diffracted from the binary grating (31) to enter the mask (4), and adjusting a gating density of the mask (4) to homogenize an energy density of the laser beam; and
Step S4. scanning treatment: using the laser beam subjected to shaping and energy homogenization to perform heat treatment on the surface of the workpiece in a scanning movement manner.

6. The laser heat treatment process according to claim 5, characterized in that:
calculation equations of a diffraction angle of the laser beam are as follows:

$T(\sin \alpha + \sin \beta) = m\lambda;$ $\beta = \sin \beta = \lambda/T - \sin \alpha;$ $\sin \alpha = 0 (\alpha < 10°);$ $\beta = \beta/T;$ T corresponds to a diffraction period of the binary grating, β is a diffraction angle of the binary grating, α is an incidence angle of the binary grating, m is a diffraction order of the binary grating, and λ is a wavelength of the incident light.

7. The laser heat treatment process according to claim 6, characterized in that:
in Step S3, a change in the energy density of the laser beam is time series related.

8. The laser heat treatment process according to claim 5, characterized in that:
the focusing assembly (6) comprises at least one cylindrical lens, the cylindrical lens being a convex lens.

9. The laser heat treatment process according to claim 8, characterized in that:
in Step S3, a change in the energy density of the laser beam is time series related.

10. The laser heat treatment process according to claim 5, characterized in that:
laser beam oscillating waveforms generated by the laser source (1) comprise a sine wave, a rectangular wave, a triangular wave, a series circular wave, and a series elliptical wave.

11. The laser heat treatment process according to claim 10, characterized in that:
in Step S3, a change in the energy density of the laser beam is time series related.

12. The laser heat treatment process according to claim 5, characterized in that:
in Step S4, a position and a speed of the laser beam irradiating the surface of the workpiece are controlled by the X-direction mirror (5) and the Y-direction mirror (10) to realize dynamic adjustment.

13. The laser heat treatment process according to claim 12, characterized in that:
in Step S3, a change in the energy density of the laser beam is time series related.

14. The laser heat treatment process according to claim 12, characterized in that:
in Step S4, a movement of the laser beam is changeable unidirectionally by changing a position of the focusing assembly (6).

15. The laser heat treatment process according to claim 14, characterized in that:
in Step S3, a change in the energy density of the laser beam is time series related.

16. The laser heat treatment process according to claim 5, characterized in that:
in Step S2, spot shapes of the laser beam shaped by the binary grating (31) comprise a rectangular shape and a circular shape.

17. The laser heat treatment process according to claim 16, characterized in that:
in Step S3, a change in the energy density of the laser beam is time series related.

18. The laser heat treatment process according to claim 5, characterized in that:
in Step S3, a change in the energy density of the laser beam is time series related.

* * * * *